(12) United States Patent
Du et al.

(10) Patent No.: US 8,768,014 B2
(45) Date of Patent: Jul. 1, 2014

(54) SYSTEM AND METHOD FOR IDENTIFYING A PERSON WITH REFERENCE TO A SCLERA IMAGE

(75) Inventors: Eliza Yingzi Du, Indianapolis, IN (US); Darrell WuDunn, Indianapolis, IN (US); N. Luke Thomas, Indianapolis, IN (US)

(73) Assignee: Indiana University Research and Technology Corp., Indianapolis, IN (US)

( * ) Notice: Subject to any disclaimer, the term of this patent is extended or adjusted under 35 U.S.C. 154(b) by 319 days.

(21) Appl. No.: 13/144,517

(22) PCT Filed: Jan. 14, 2010

(86) PCT No.: PCT/US2010/020991
§ 371 (c)(1),
(2), (4) Date: Jul. 14, 2011

(87) PCT Pub. No.: WO2010/129074
PCT Pub. Date: Nov. 11, 2010

(65) Prior Publication Data
US 2012/0163678 A1    Jun. 28, 2012

Related U.S. Application Data

(60) Provisional application No. 61/260,451, filed on Nov. 12, 2009, provisional application No. 61/144,508, filed on Jan. 14, 2009.

(51) Int. Cl.
*G06K 9/00* (2006.01)

(52) U.S. Cl.
USPC ........... 382/117; 382/118; 382/128; 382/167; 382/209; 382/274

(58) Field of Classification Search
USPC .......................... 382/110, 115, 117, 128, 167
See application file for complete search history.

(56) References Cited

U.S. PATENT DOCUMENTS

| | | | | |
|---|---|---|---|---|
| 5,627,621 | A  * | 5/1997 | Kodama | 396/373 |
| 5,810,005 | A  * | 9/1998 | Dublin et al. | 600/398 |
| 7,130,453 | B2 * | 10/2006 | Kondo et al. | 382/117 |
| 7,298,874 | B2 * | 11/2007 | Cho | 382/118 |
| 7,751,598 | B2 * | 7/2010 | Matey et al. | 382/117 |
| 7,959,289 | B2 * | 6/2011 | Cattin-Liebl | 351/206 |
| 8,369,595 | B1 * | 2/2013 | Derakhshani et al. | 382/128 |
| 2003/0118217 | A1 * | 6/2003 | Kondo et al. | 382/117 |

(Continued)

OTHER PUBLICATIONS

International Searching Authority; International Search Report and Opinion of the International Searching Authority for PCT Application No. PCT/US2010/020991; Mailed Sep. 23, 2010 (8 pages).

(Continued)

*Primary Examiner* — Vu Le
*Assistant Examiner* — Aklilu Woldemariam
(74) *Attorney, Agent, or Firm* — Maginot, Moore & Beck, LLP

(57) ABSTRACT

A method for obtaining an identification characteristic for a subject includes acquiring an image of an eye of the subject, segmenting the eye image into different regions, extracting features in a sclera region segmented from the eye image, and generating data identifying at least one feature extracted from the sclera region of the eye image.

26 Claims, 7 Drawing Sheets

(56) References Cited

U.S. PATENT DOCUMENTS

| | | | |
|---|---|---|---|
| 2004/0114782 A1* | 6/2004 | Cho | 382/117 |
| 2005/0272833 A1* | 12/2005 | Doshi | 523/160 |
| 2006/0147094 A1* | 7/2006 | Yoo | 382/117 |
| 2006/0165266 A1 | 7/2006 | Hamza | |
| 2007/0047772 A1 | 3/2007 | Matey et al. | |
| 2008/0159604 A1 | 7/2008 | Wang et al. | |
| 2009/0103784 A1* | 4/2009 | Forutanpour | 382/117 |
| 2009/0169064 A1* | 7/2009 | Kim et al. | 382/117 |
| 2009/0303437 A1* | 12/2009 | Cattin-Liebl | 351/206 |

OTHER PUBLICATIONS

Mark Nixon; "Eye Spacing Measurement for Facial Recognition"; SPIE vol. 575 Applications of Digital Image Processing VIII (1985) pp. 279-285 (7 pages).

Derakhshani, Reza et al.; "A New Biometric Modality Based on Conjunctival Vasculature"; Proc. of Artificial Neural Networks in Engineering (ANNIE), (St. Louis, USA), Nov. 2006 (8 pages).

Derakhshani, Reza et al.; "A Texture-Based Neural Network Classifier for Biometric Identification using Ocular Surface Vasculature"; Proc. of International Joint Conference on Neural Networks (IJCNN), (Orlando, USA), Aug. 2007 (6 pages).

Crihalmeanu, Simona et al.; "Enhancement and Registration Schemes for Matching Conjunctival Vasculature"; Lecture Notes in Computer Science; vol. 5558/2009, pp. 1240-1249; 2009 (10 pages).

Arvacheh, E. M. et al.; "Iris Segmentation: Detecting Pupil, Limbus and Eyelids"; IEEE International Conference on Image Processing; Oct. 2006 (4 pages).

Daugman, John; "New Methods in Iris Recognition"; IEEE Transactions on Systems, Man, and Cybernetics—Part B: Cybernetics; vol. 37, No. 5; Oct. 2007 (9 pages).

Du, Yingzi et al.; "Video Based Non-Cooperative Iris Segmentation"; Proc. of SPIE; vol. 6982; 2008 (10 pages).

Proenca, Hugo; "Iris Recognition: On the Segmentation of Degraded Images Acquired in the Visible Wavelength"; IEEE Transactions on Pattern Analysis and Machine Intelligence; Vol. 32, No. 8; Aug. 2010 (15 pages).

Abdullah-Al-Wadud, M. et al; "Region-of-Interest Selection for Skin Detection Based Applications"; 2007 International Conference on Convergence Information Technology; 2007 (6 pages).

Abdullah-Al-Wadud, M. et al; "Skin Segmentation Using Color Distance Map and Water-flow Property"; The Fourth International Conference on Information Assurance and Security; 2008 (6 pages).

* cited by examiner

US 8,768,014 B2

SYSTEM AND METHOD FOR IDENTIFYING A PERSON WITH REFERENCE TO A SCLERA IMAGE

GOVERNMENT INTEREST

This invention was made with government support under contract N00014-07-1-0788 awarded by the Office of Naval Research. The government has certain rights in the invention.

PRIORITY CLAIM

This application claims priority from International Application PCT/US10/20991, which is entitled "SYSTEM AND METHOD FOR IDENTIFYING A PERSON WITH REFERENCE TO A SCLERA IMAGE," and was filed on Jan. 14, 2010. This application claims further priority from U.S. Provisional Application No. 61/144,508 filed on Jan. 14, 2009 and from U.S. Provisional Application No. 61/260,451 which was filed on Nov. 12, 2009.

TECHNICAL FIELD

The system and method described below relate to the identification of a person or an animal with reference to external physical characteristics of the person or animal, and, more specifically, with reference to externally observable physical characteristics of one or more eyes of the person or animal.

BACKGROUND

Systems for identifying persons through intrinsic human traits have been developed. These systems operate by taking images of a physiological trait of a person and comparing information stored in the image to image data corresponding to the imaged trait for a particular person. When the information stored in the image has a high degree of correlation to the relevant data previously obtained for a particular person's trait, positive identification of the person may be obtained. These biometric systems obtain and compare data for physical features, such as fingerprints, voice, facial characteristics, iris patterns, hand geometry, retina patterns, and hand/palm vein structure. Different traits impose different constraints on the identification processes of these systems. For example, fingerprint recognition systems require the person to be identified to contact an object directly for the purpose of obtaining fingerprint data from the object. Similarly, retina pattern identification systems require a person to allow an imaging system to scan the retinal pattern within one's eye for an image capture of the pattern that identifies a person. Facial feature recognition systems, however, do not require direct contact with a person and these biometric systems are capable of capturing identification data without the cooperation of the person to be identified.

One trait especially suited for identification is sclera patterns in a person's eye. The human eye sclera provides a unique trait that changes little over a person's lifetime. It also provide multi-layer information that can be used for liveness test. It is important to design a method to segment and match the sclera pattern accurately and robustly.

SUMMARY

A method has been developed that obtains an identification characteristic from the sclera of a subject's eye. The method includes acquiring an image of an eye of a subject, segmenting the eye image into different regions, extracting features in a sclera region segmented from the eye image, and generating data identifying at least one feature extracted from the sclera region of the eye image.

A system that implements the method also obtains an identification characteristic from the sclera of a subject's eye. The system includes a digital camera configured to acquire an image of an eye of a subject, a digital image processor configured to segment the eye image into different regions, to extract features in a sclera region segmented from the eye image, and to generate data identifying at least one feature extracted from the sclera region of the eye image, and a database for storage of identifying data.

DETAILED DESCRIPTION

The method and system discussed below use patterns in the sclera of an eye, especially a human eye, for identification. Therefore, the present invention provides an identification technique based on the recognition of the unique features of the sclera, referred to herein as "Sclera Recognition". In general, the method of identification includes illuminating an eye, obtaining an image of the eye (sclera, iris, and pupil), segmenting the image, extracting features from the sclera region, registering those extracted features, and generating a template. This template may be stored and compared to templates obtained from eye images of other subjects to identify the subsequent subject as being the same subject from which the stored template was obtained.

Figure 1:
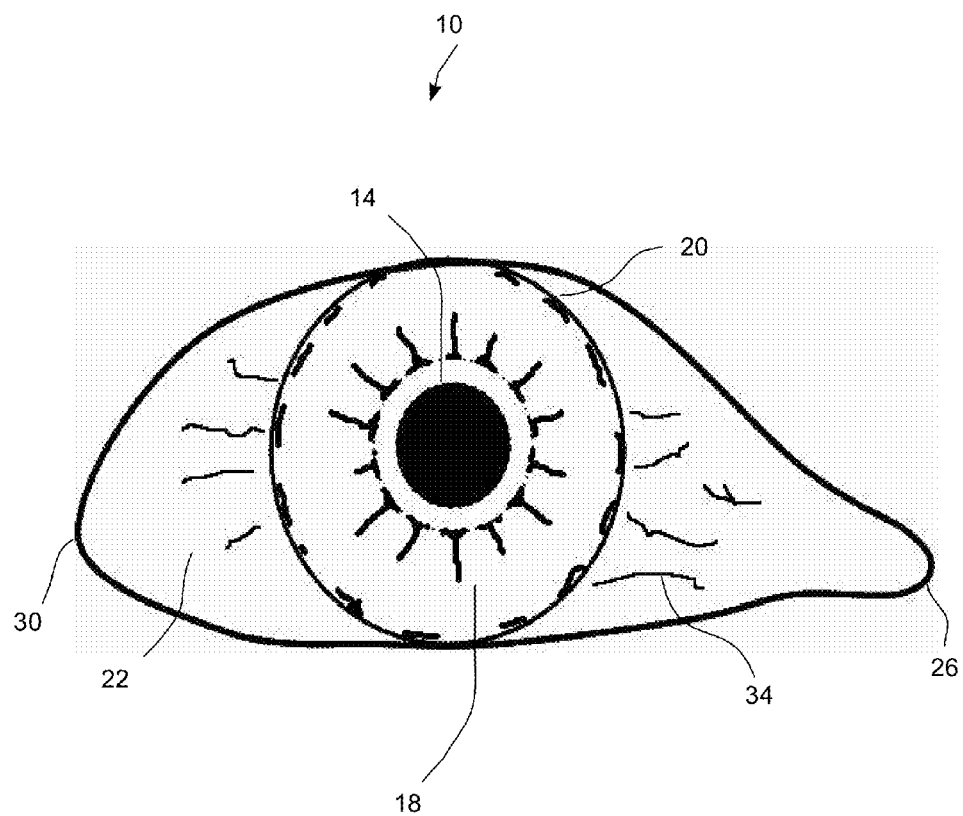
FIG. 1 depicts a frontal image of a human eye and identifies the relevant parts of the image.

An illustration of a human eye is shown in FIG. 1. The eye 10 includes a pupil 14 surrounded by an iris 18. A limbic boundary 20 separates the iris 18 from the sclera region 22. A medial point 26 identifies the area where a tear duct is typically located and the lateral point 30 identifies an outside edge of the image. Within the sclera 22 are blood vessels 34 that form patterns. These patterns have been determined to be sufficiently unique that may be used to identify a subject.

Figure 2:
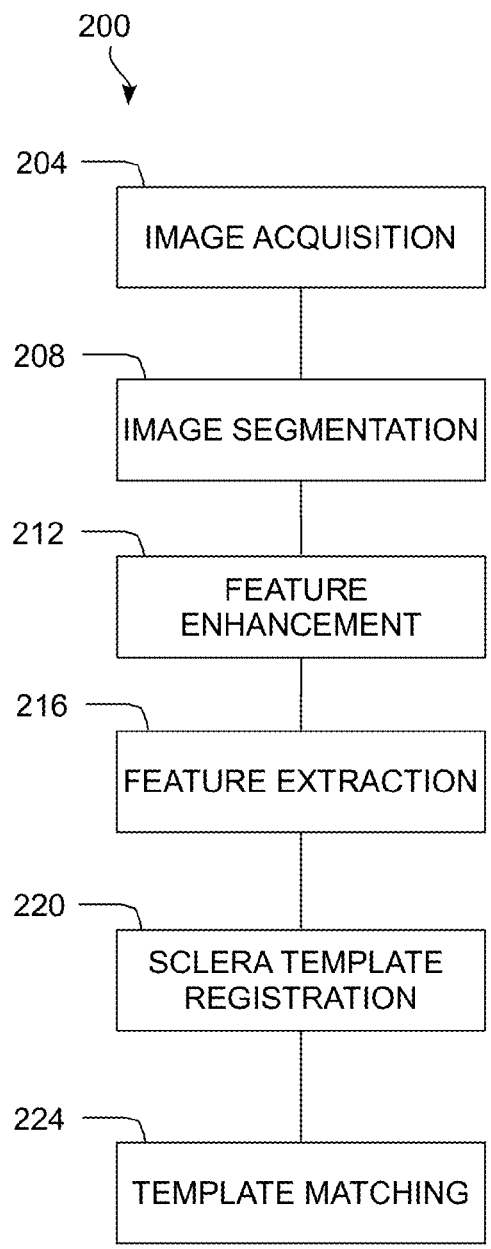
FIG. 2 is a flow diagram of a method for identifying a subject from features in a sclera region of an eye image.

A method for identifying a person from an image of a person's eye is shown in FIG. 2. The process 200 begins with an acquisition of a color image of a subject's eye (block 204). Imaging of an eye may include illumination of the eye in near infrared, infrared, visible, multispectral, or hyperspectral frequency light. The light may be polarized or non-polarized and the illumination source may be close or remote from the eye. A light source close to an eye refers to a light source that directly illuminates the eye in the presence of the subject. A remote light source refers to a light source that illuminates the eye at a distance that is unlikely to be detected by the subject. As noted below, adjustments may be made to the image to compensate for image deformation that may occur through angled image acquisition or eye movement. Thus, the eye image may be a frontal image or a deformed image. The image acquisition may be performed with a digital camera having an adequate resolution for imaging blood vessels within the subject's eye.

Figure 3:
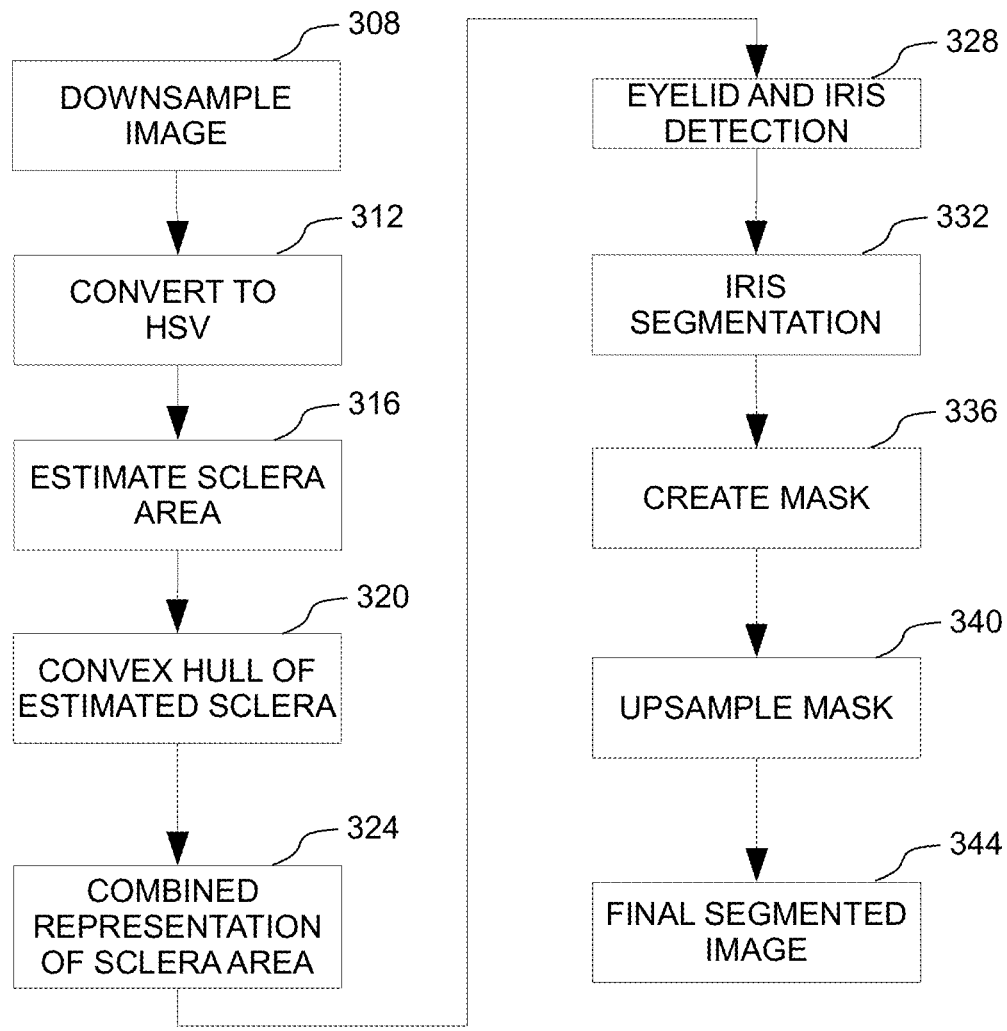
FIG. 3 is a flow diagram of a method for segmenting an image of an eye, including segmenting the sclera and iris regions.

The process of FIG. 2 continues by segmenting the image into various regions (block 208) with an example segmentation process depicted in FIG. 3. The image may be downsampled to a smaller size before further processing occurs (block 308). In the embodiment of FIG. 3, the downsampling produces a downsampled image $\frac{1}{25}^{th}$ the size of the original image, but different amounts of downsampling may be used depending upon the original image size and the available processing hardware.

The binary data representing pixels of the eye image are converted from an initial red, green, blue (RGB) color space, to an intermediate luma, red-difference, blue-difference (YCrCb) color space, and then into a hue, saturation, brightness value (HSV) color space (block 312) using transformations listed below.

$$\begin{bmatrix} Y \\ C_R \\ C_B \end{bmatrix} = \begin{bmatrix} .299 & .587 & .114 \\ -.169 & -.331 & .499 \\ .499 & -.418 & -.0813 \end{bmatrix} \begin{bmatrix} R \\ G \\ B \end{bmatrix} + \begin{bmatrix} 0 \\ 128 \\ 128 \end{bmatrix} \quad \text{Equation 1}$$

$$\begin{bmatrix} H \\ S \\ V \end{bmatrix} = \begin{bmatrix} \tan^{-1} \frac{C_B}{C_R} \\ \sqrt{C_R^2 + C_B^2} \\ Y \end{bmatrix} \quad \text{Equation 2}$$

In Equation 1, the red (R), green (G), and blue (B) numeric values corresponding to each pixel undergo a cross product matrix transform with the weighting matrix of equation 1. The numeric RGB values in equation 1 are in a range of 0 to 255, but larger or smaller ranges using modified matrix coefficients are possible for alternative binary image formats. The resulting matrix is then adjusted by adding 128 to each of the Cr and Cb values, resulting in a YCrCb matrix. The YCrCb matrix is then transformed into an HSV matrix using the transformations listed in equation 2. The transformations listed above are repeated for each pixel in the eye image, producing an image in the HSV color space. Both the original RGB and the transformed HSV color space values are used in different steps of the segmentation process of FIG. 3.

The process of FIG. 3 continues by estimating the area of the sclera within the HSV image (block 316). The estimated sclera area is determined using a combination of two different techniques. One technique is rooted in the observation that the eye image includes both a "skin" portion, including the eyelids, and a "non-skin" portion containing the sclera. Using color distance maps, the skin area of the image is determined, and the inverse portions of the image are then interpreted as being the sclera. Two example color distance map (CDM) equations are listed below.

$$CDM_1 = \begin{cases} 1, & \begin{array}{l} R > 95, G > 40, B > 20, \\ \max(R, G, B) - \min(R, G, B) > 15, \\ |R - G| > 15, R > G, R > B \end{array} \\ 0, & \text{else} \end{cases} \quad \text{Equation 3}$$

$$CDM_2 = \begin{cases} 1, & \begin{array}{l} R > 220, G > 210, B > 170, \\ \max(R, G, B) - \min(R, G, B) > 15, \\ |R - G| \le 15, R > B, B > G \end{array} \\ 0, & \text{else} \end{cases} \quad \text{Equation 4}$$

$$S_1(x, y) = \begin{cases} 1, & CDM_1(x, y) \text{ OR } CDM_2(x, y) = 0 \\ 0, & \text{else} \end{cases} \quad \text{Equation 5}$$

Equation 3 describes an example $CDM_1$ for a photograph taken using a natural source of illumination, such as sunlight. Equation 4 is an example $CDM_2$ for a photograph taken using a flash illuminator. Each of the CDMs is described using the red, green, blue (RGB) color space, with typical values of each RGB component ranging from 0 to 255. The CDM may be applied to each RGB pixel, yielding a 0 or 1 depending upon the pixel's color threshold value. Depending upon the illumination source, either $CDM_1$ or $CDM_2$ is used produce a binary sclera map S at each pixel position x, y of the original image as show in equation 5. The two dimensional binary sclera map contains a value of 1 corresponding to a pixel determined to be in the sclera, or 0 for a pixel determined to be outside the sclera.

Another method of producing a sclera map is rooted in the observation that the sclera is also known as the "white" portion of the eye. Using the HSV values image values, each pixel in the image is assigned a 0 or 1 value according to the threshold equation below.

$$S_2(x, y) = \begin{cases} 1, & \begin{array}{l} \text{if } H(x, y) \le th_h \\ \text{and } S(x, y) \le th_s \\ \text{and } V(x, y) \ge th_v \end{array} \\ 0, & \text{else} \end{cases} \quad \text{Equation 6}$$

The threshold values $th_h$, $th_s$, and $th_v$ in Equation 6 are heuristically determined in order to set the threshold for the hue in the approximately lower ⅓ of the image, the saturation in the approximately lower ⅖ of the image, and the brightness in the upper ⅔ of the image. These heuristic thresholds are calculated based on histogram distributions of each image using the equations listed below.

$$th_h = \arg\{t | \min|\Sigma_{x=1}^t p_h(x) - T_h|\}, \quad \text{Equation 7}$$

$$th_s = \arg\{t | \min|\Sigma_{x=1}^t p_s(x) - T_s|\}, \quad \text{Equation 8}$$

$$\text{and } th_v = \arg\{t | \min|\Sigma_{x=1}^t p_v(x) - T_v|\} \quad \text{Equation 9}$$

In Equations 7-9, $p_h(x)$ is the normalized histogram of the hue image, $p_s(x)$ is the normalized histogram of the saturation image, and $p_v(x)$ is the normalized histogram of the value image. The fixed threshold values $T_h$, $T_s$, and $T_v$ are chosen to be ⅓, ⅖, and ⅔, respectively, matching the preferred thresholds discussed above. The result $S_2(x,y)$ is the binary sclera map produced with the HSV method.

Morphological operations are applied to each binary sclera map $S_1$ and $S_2$ in order to eliminate stray pixels that do not match the surrounding pixels. The preferred result of the morphological operations are two contiguous regions in each binary sclera map corresponding to the portions of the sclera 22 on the left and right side of the iris 18 as depicted in FIG. 1.

Continuing to refer to FIG. 3, a convex hull calculation is applied to each binary sclera map (block 320). The convex hull is the minimal convex set of points that contains the entire original set. It can be visualized as the boundary of the set of points that contains all of the points, without requiring a concave segment, or as if an elastic band were stretched around the set of points. In the case of the sclera maps $S_1$ and $S_2$, the convex hull is formed around the set of points determined to be in the sclera region of the image.

The complete estimated sclera region is formed by selectively combining the binary maps $S_1$ and $S_1$ after the convex hull operation has been completed (block 324). The regions to be selected for the combined binary sclera map are chosen based on homogeneity of the pixel colors from the original image that correspond to the sclera regions of each binary sclera map. The sclera map region that corresponds to the most homogeneous color distribution in the original downsampled image is chosen to represent the sclera area. The homogeneity is determined using the equation below.

$$r = \arg\left\{i \left| \min \sum_{(x,y)\in S_i} (I(x,y) - m_i)^2 \right.\right\}, \quad \text{Equation 10}$$

The preferred region r is selected from one of the two binary sclera maps based on the minimum standard deviation between image intensity of individual $I(x, y)$ in the region, and the mean intensity $m_i$ for all pixels in the region. The lower standard of deviation from the mean value indicates a more homogenous region, and that region is chosen to represent the estimated sclera area.

Figure 4:
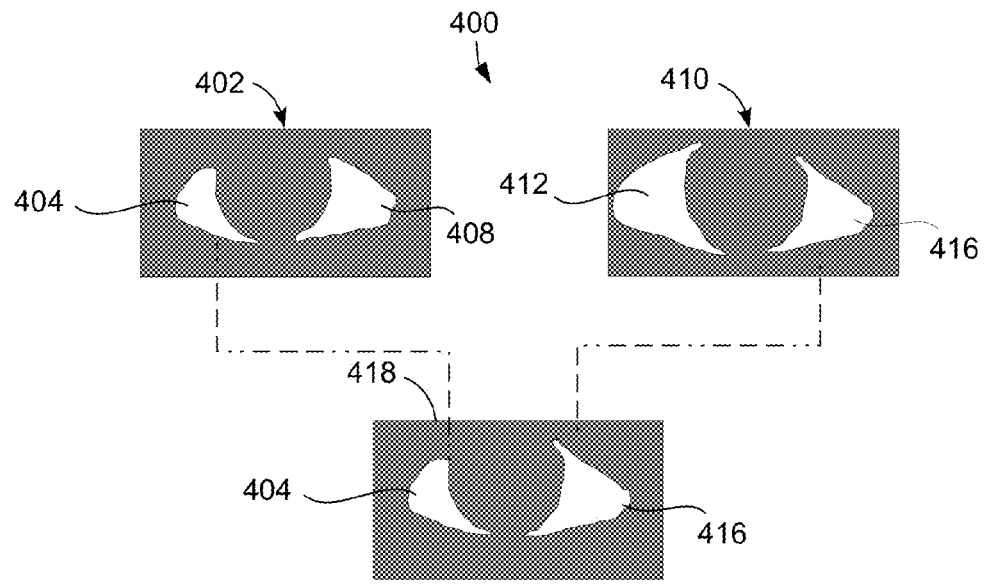
FIG. 4 depicts a representation of the sclera region of an eye image formed from two different representations of the sclera in the eye image.

An example of two binary sclera maps and a combined estimated sclera area map 400 is depicted in FIG. 4. The first sclera image 402 is shown as an example of the binary sclera map $S_1$, and the second sclera image 410 is an example of the binary sclera map $S_2$. Binary sclera map 402 contains a left sclera portion 404, and right sclera portion 408, as does binary sclera map 410 at 412 and 416, respectively. The homogeneity of each sclera region from binary sclera maps 402 and 410 is calculated using equation 10 and the color values from the original downsampled image that correspond to the locations in each sclera region. In the example of FIG. 4, the fused estimated sclera region 418 combines the left sclera region 404 of binary sclera map 402 with the right sclera portion 416 of binary sclera map 410. The fused sclera region 418 of FIG. 4 is merely presented as one possible example of an estimated sclera area, and the method of FIG. 3 produces different results for different images. For example, the homogenous regions could both be contained in either $S_1$ or $S_2$.

Figure 8:
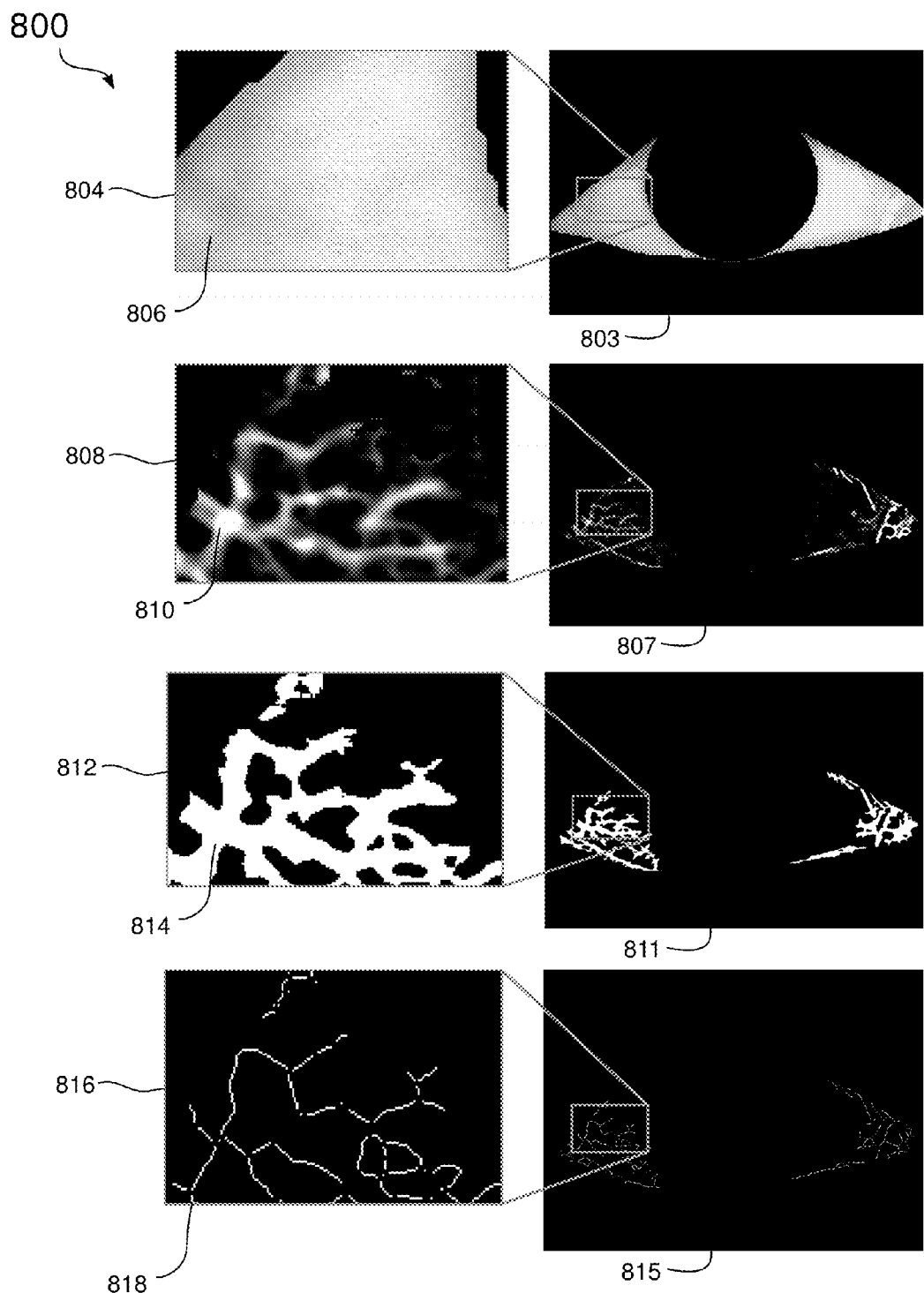
FIG. 8 depicts frontal images of the sclera region of an eye, an enhanced view of the sclera veins, a binary representation of the sclera veins, and the sclera veins represented as single-pixel wide lines.

Referring again to FIG. 3, the fused sclera region map forms the top and bottom boundaries for initiating eyelid and iris detection (block 328). Because the sclera is much lighter than the iris area, edge detection may be used to identify the edges of the limbic boundary between the iris and the sclera. After the initial boundaries are detected, the edges defining the sclera, iris, and eyelid regions may be further refined using Fourier active contour techniques known to the art. An alternative method uses two dimensional polynomial curves to model the eyelids. Any eyelashes that extend into the sclera region of the image are also detected and removed. These eyelash portions are modeled as high edge areas with a light background. The refinements removing the iris, eyelid, and eyelash elements further define the estimated portion of the downsampled image that corresponds to the sclera. An example of a segmented sclera image is depicted in FIG. 8 at 803 and 804. The iris 18 is also segmented in the eye image (block 332). If the sclera is of primary concern, the iris may be segmented using a circular estimated region placed between the left and right portions of the refined estimated sclera region.

The refined estimated binary sclera region forms an image mask pattern (block 336). This mask is then upsampled back to the size of the original image (block 340). In the example of FIG. 3, the upsampling ratio would increase the original mask by a factor of 25 to reverse the downsampling. The binary image mask is aligned with the original image, and the portions of the original image that match the binary mask are preserved, resulting in a segmented sclera portion of the original image (block 344).

Returning to the process of FIG. 2, the segmented sclera image contains features such as vein patterns, vein lines, and extrema points that are enhanced to improve feature detection (block 212). The surface of an eye is often highly reflective, which makes focusing of an imaging device photographing the eye difficult. The result is that features within the sclera region may be blurred, and have a low contrast ratio in the image. In order to enhance feature patterns, a Gabor filtering technique may be used to differentiate the features from the surrounding sclera. The Gabor filtering process applies the Gabor filter of equation 11 using the transformation of equation 12 on the segmented sclera image.

$$G(x, y, \vartheta, s) = e^{-\pi\left(\frac{(x-x_0)^2 + (y-y_0)^2}{s^2}\right)} e^{-2\pi i(\cos\vartheta(x-x_0) + \sin\vartheta(y-y_0))}, \quad \text{Equation 11}$$

$$I_F(x, y, \theta, s) = I(x, y) * G(x, y, \theta, s) \quad \text{Equation 12}$$

$G(x, y, \theta, s)$ represents one or more two-dimensional Gabor filters oriented in different directions. In the Gabor filter of Equation 11, x and y represent the center frequency of the filter, $\theta$ is the angle of sinusoidal modulation, and s is the variance of a Gaussian function. $I(x, y)$ is the pixel intensity at each point in the image which is convolved with the Gabor filter. The convolution results in a filtered Gabor image $I_F(x, y, \theta, s)$ of Equation 12 at a given orientation $\theta$ and Gaussian variance s. By altering $\theta$, the Gabor filters may be placed into multiple orientations producing a unique filtered image function $I_F(x, y, \theta, s)$ for each value of $\theta$.

Figure 5:
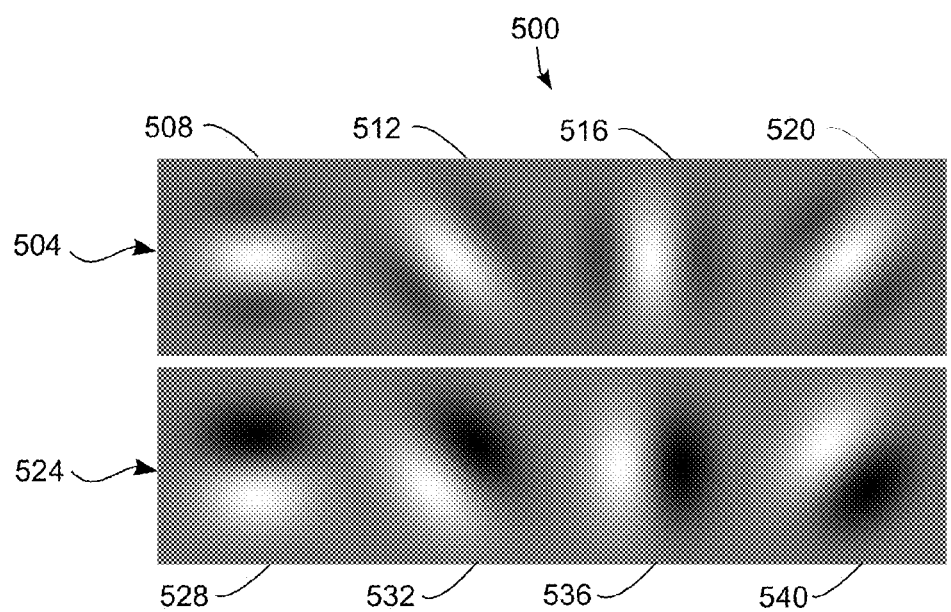
FIG. 5 depicts an odd and even series of two dimensional Gabor filters.

Two example Gabor filter sets are depicted in FIG. 5. The first filter set 504 is an even Gabor filter set with multiple orientations 508, 512, 516, and 520. The second filter set 524 is an odd Gabor filter set with multiple orientations 528, 532, 536, and 540. Either the even or odd filter set may be used in the transformation of equation 11.

The multiple Gabor filtered images are fused into a vein-boosted image $F(x, y)$ using the following equation.

$$F(x,y) = \sqrt{\Sigma_{\theta \in \Theta} \Sigma_{s \in S} (I_F(x,y,\theta,s))^2} \quad \text{Equation 13}$$

An example of a portion of the sclera image without Gabor filtering is depicted in FIG. 8 at 804. The image includes vein features 806. An example Gabor filtering process using the even filter set 504 is applied, and the individual results are fused using Equation 13 to produce results 808 with vein structure 810.

The Gabor filtered image is converted to a binary image using an adaptive threshold, which is determined based on the distribution of filtered pixel values via the following equations.

$$B(x, y) = \begin{cases} 1, & F(x, y) > th_b, \\ 0, & \text{else} \end{cases} \quad \text{Equation 14}$$

$$th_b = \arg\left\{ t \Big| \min\Big| \sum_{x=1}^{t} P_{edge}(x) - T_B \Big| \right\}. \quad \text{Equation 15}$$

The binary enhanced image B(x, y) has a 1 value where the fused Gabor-filtered image F(x, y) exceeds threshold $th_b$, and is 0 otherwise. The threshold $th_b$ is calculated using $p_{edge}$, the normalized histogram of the non-zero elements of F(x, y). $T_b$ is selected to be ⅓ in the example embodiment because the zero elements of the filtered image may outnumber the non-zero image elements, and the vascular patterns often have a higher magnitude than the background. An example of a binary enhanced image of the segmented sclera region is depicted in FIG. 8 at 812, with vein features 814.

Referring to the example process of FIG. 2, the sclera features contained within the binary enhanced image are extracted using a line segment descriptor technique (block 216). The thickness of sclera features, including the thickness of veins in the sclera, varies depending upon the dilation or constriction of the veins. This variability results in veins appearing thicker or thinner in unpredictable ways, and some thinner veins disappear when constricted. Binary morphological operations known to the art reduce the detected vein structure to a single-pixel wide skeleton, and remove the branch points where multiple veins overlap. The branch points are removed because sclera veins move relative to each other over time, leading to changes in branch points that could produce inaccurate matching results. The morphological operations leave a set of single-pixel wide lines representing the vein structure, with one example depicted in FIG. 8 at 816 with single-pixel wide veins 818.

The line segment descriptor technique continues with a line parsing sequence. The line parsing sequence converts the curved lines representing sclera vein features into a series of linear elements that may be stored in a computer database. The original vein features are approximated by line segments, and the line segments are recursively split into smaller segments until the vein features are substantially linear.

Figure 6:
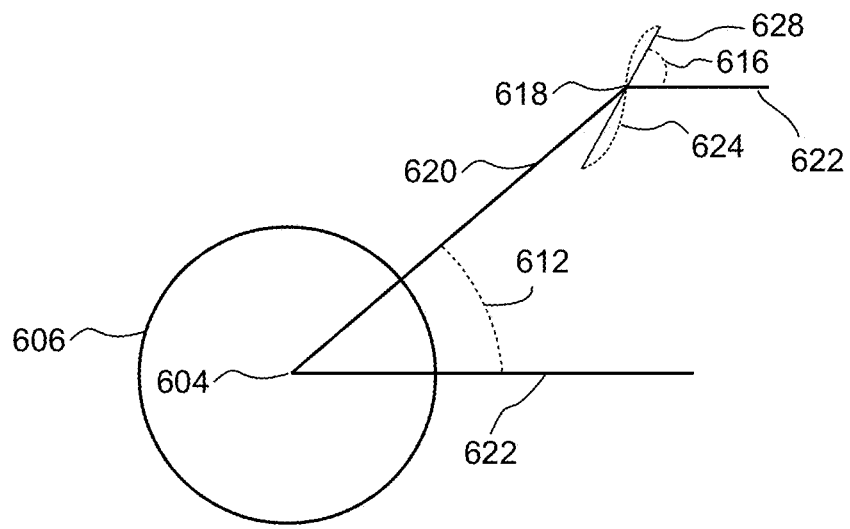
FIG. 6 depicts a line segment being used to approximate the position and shape of a portion of a vein in the sclera.

An example of a line segment in the parsing sequence is depicted in FIG. 6. A fixed central reference point 604, usually the center of the pupil 606, is used as a central point from which radial lines such as line 620 extend. The use of a known central point allows for correct relative positions of vein features to be recorded even if the eye moves to a different position relative to the imaging device. Each radial line 620 intersects the center point of a linear element 628. The linear element 628 approximates a non-linear section of a vein feature 624. The linear element 628 is described by the polar coordinate 618 of its center point, its length, and the angle 616 of the linear element 628 from a horizontal line 622 (ø). The polar coordinate of the center of linear element 628 is the radius of radial line 620 and the angle 624 of the radial line (θ) from a horizontal line 622. By storing the identifying elements for each linear element 628, the vein features present in the sclera may be extracted and stored in a computer readable manner. The coordinates ($x_p$, $y_p$) locating the pupil's center 604 are also stored, providing an absolute position from which each linear element 628 may be referenced by polar coordinates.

During eye image acquisition, the eye may move or the camera may be positioned at an angle with respect to the eye being imaged. These factors affect the location of the sclera patterns presented inside the image. To remove these effects, sclera template registration is performed (block 220). The location of the limbic boundary, pupil center, limbic center, medial, and/or lateral may be used to define a location of features/patterns and further used for registration of the features/patterns. Sclera region of interest (ROI) selection achieves global translation, rotation, and scaling-invariance. In addition, due to the complex deformation that can occur in the vein patterns, the registration scheme accounts for potential changes in vein patterns while maintaining recognition patterns with acceptable false-positive rates.

A technique for registering the sclera template features based on random sample consensus (RANSAC) is an iterative model-fitting method that can register the sclera features. The RANSAC method registers the coordinates of the center points 618 of each linear element 628 used to model the sclera veins. The center point coordinates and angles, but not the lengths of the linear descriptors are registered in order to prevent false-accepts due to over-fitting the registered features.

When an eye has been registered via the registration process in block 220, an identification system may use the registered template to perform matching between the stored template and an image of a candidate eye. This process commonly occurs in biometric authentication systems where a user is registered with the identification system, and the user authenticates with the identification system at a later time. The registration minimizes the minimum distance between the recorded test template and the target templates that are acquired later for matching with the test template. This reduces artificially introduced false accepts because different parameters are used for registration than are used for matching, so the preferred registration and preferred matching is different for templates that should not match. The registration process randomly chooses two points—one $S_{xi}$ from the test template, and one $S_{yj}$ from the target template. The registration process also randomly chooses a scaling factor and a rotation value, based on apriori knowledge of the template database. Using these values, a fitness value for the registration using these parameters is calculated for each segment in the image using the segment's polar coordinates r and θ and the line segment's angle ø. The test template parameter $S_{xi}$ and target template parameter $S_{yj}$, are defined below.

$$S_{xi} = \begin{pmatrix} \theta_{xi} \\ r_{xi} \\ \phi_{xi} \end{pmatrix} \text{ and } S_{yj} = \begin{pmatrix} \theta_{yj} \\ r_{yj} \\ \phi_{yj} \end{pmatrix} \quad \text{Equation 16}$$

An offset vector is calculated using the shift offset and randomly determined scale and angular offset values, $s_0$ and $\theta_0$. The polar coordinates are transformed into Cartesian coordinates and combined with the scale $s_0$ and angular offset $\theta_0$ to describe the line segment $\phi_0$ in equations 17-19.

$$\varphi_0 = \begin{pmatrix} x_o \\ y_o \\ s_o \\ \phi_o \end{pmatrix} \quad \text{Equation 17}$$

$$x_o = r_{xi}\cos\theta_{xi} - r_{yj}\cos\theta_{yj} \quad \text{Equation 18}$$

$$y_o = r_{xi}\sin\theta_{xi} - r_{yj}\sin\theta_{yj} \quad \text{Equation 19}$$

The fitness of two descriptors is the minimal summed pairwise distance between the two descriptors $S_x$ and $S_y$ given offset vector, $\phi_0$.

$$D(S_x, S_y) = \operatorname*{argmin}_{\varphi_0} \tilde{D}(S_x, S_y, \varphi_0) \quad \text{Equation 20}$$

$$\tilde{D}(S_x, S_y, \varphi_0) = \sum_{x_i \in Test} \operatorname{minDist}(f(S_{xi}, \varphi_0), S_y) \quad \text{Equation 21}$$

Where $f(S_{xi}, \phi_0)$ is the function that applies the registration given the offset vector to a sclera line descriptor.

$$f(S_{xi}, \varphi_0) = \begin{pmatrix} \cos^{-1}\left(\frac{r_{xi}\cos\theta_{xi} + x_o}{S_o r_{xi}}\right) \\ \frac{r_{xi}\cos\theta_{xi} + x_o}{\cos(\theta_{xi} + \phi_o)} \\ \phi_{xi} \end{pmatrix} \quad \text{Equation 22}$$

The minimum pairwise distance between the selected test template line segment $S_{xi}$ and the entire set of target template line segments Sy is calculated using the equation listed below. The line segment in the target template closest to segment $S_{xi}$ is assumed to be the nearest matching sclera vein segment. This calculation allows for matching when the sclera veins in the target image have moved after the test template was recorded.

$$\operatorname{minDist}(S_{xi}, S_y) = \operatorname*{argmin}_j \{d(S_{xi}, S_{yj})\} \quad \text{Equation 23}$$

With the distance between two points calculated using the equation listed below.

$$d(S_{xi}, S_{yj}) = \sqrt{(x_o)^2 + (y_o)^2} \quad \text{Equation 24}$$

Where, Test is the set of descriptors in the stored test template, Target is the set of descriptors in the newly acquired target template, $S_{xi}$ is the first descriptor used for registration, $S_{yj}$ is the second descriptor, $\phi_0$ is the set of offset parameter values, $f(S_{xi}, \phi_0)$ is a function that modifies the descriptor with the given offset values, S is the scaling factor, and is the rotation value which is determined by the sclera image resolution and system application. The process performs some number of iterations, recording the values $\phi_0$ that are minimal in $D(S_x, S_y)$.

A template for future comparisons is generated from the extracted features (block 220). The template may be, for example, a bit map of the sclera region that identifies the features, a list of features with positional information about each feature, or a set of descriptors for the extracted features. To generate the template, the location of the registered extrema points or a set of descriptors for the features are saved. Descriptors refer to the model parameters for the detected feature edges that were obtained through known curve fitting techniques, wavelets, neural network, filtering methods, and other pattern recognition methods. The parameters of the fitted curves are saved as descriptors for the extrema points. The template may be represented in a binary, integer, or floating number format. The template may now be used to identify another image of an eye as corresponding to or not corresponding to the template. The template generation process described above is merely illustrative of an appropriate process for modeling an image of the eye. Alternative processes include using a set of area, line, and/or point descriptors; a set of wavelet co-efficiencies, magnitudes, phases, or a combination thereof; and a set of vectors and/or matrices.

Figure 7:
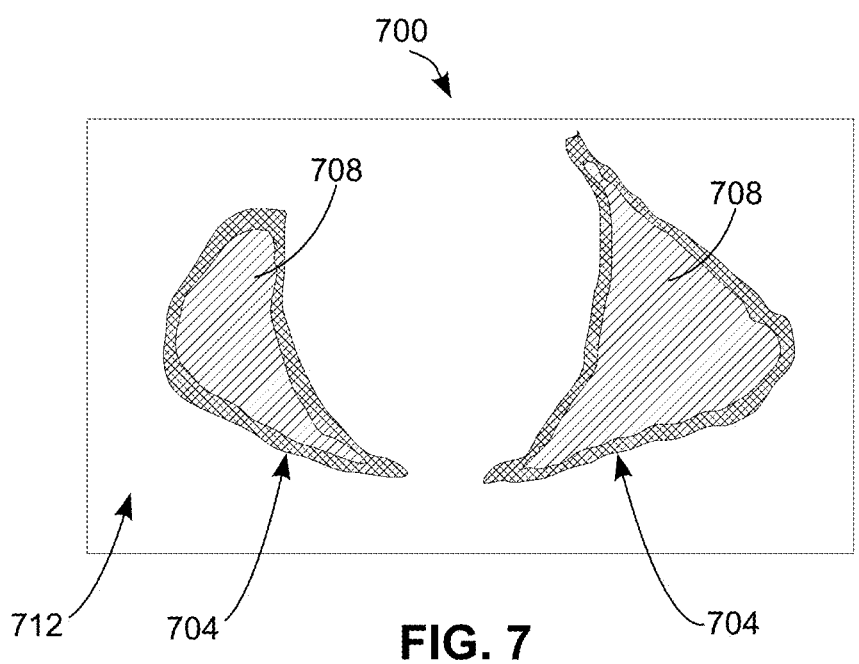
FIG. 7 is an example template of the sclera region of an eye image with an edge portion defined around the sclera region.

An identification or matching process (block 224, FIG. 2) may now be performed by repeating the eye image processing (block 204 to 220) to obtain another eye image and generate a template for the image, and then compare the generated template for the second image to a stored template to determine whether the two templates correspond to one another. The templates used in the comparison may not be completely accurate. For example, the heuristics used in segmenting the sclera may result in inaccuracies in the edge areas of the segmented sclera. As depicted in FIG. 7, each sclera template is weighted to discount the areas 794 near the edge of each template region where the inaccuracies occur. The central portion of the sclera 708 is weighted more heavily.

The matching process compares the line segments $S_i$ in the stored template with line segments $S_j$ stored in the template generated from the second eye image. The matching process produces a match score $m(S_i, S_j)$ for each line segment in the stored template using the equation below.

$$m(S_i, S_j) = \begin{cases} w(S_i)w(S_j), & d(S_i, S_j) \le D_{match} \\ & \text{and} \\ & |\phi_i - \phi_j| \le \phi_{match} \\ 0, & \text{else} \end{cases} \quad \text{Equation 25}$$

In Equation 25, $d(S_i, S_j)$ is the Euclidian distance between the center points of $S_i$ and $S_j$ calculated in Equation 23. $D_{match}$ is a predetermined threshold value for the distance between line segments considered to match, and $\phi_{match}$ represents the differences between the angles of line segments considered to match. In the example embodiment of FIG. 2, $D_{match}$ is determined to be 5 pixels, and $\phi_{match}$ is determined to be a 10° angle. If a line segment $S_i$ is within $D_{match}$ pixels and at an angle within $\phi_{match}$ of the line segment $S_j$, then the match results $m(S_i, S_j)$ are updated with the weighted values $w(S_i)$ and $w(S_j)$ of each line segment multiplied together. The example weighted values are either 1, 0.5, or 0 depending upon whether the line segment is located in the fully weighted sclera portion 708, the edge of the sclera region 704, or outside the sclera 712 respectively. If either the distance or the angle of $S_i$ and $S_j$ are greater than the threshold values $D_{match}$ and $\phi_{match}$, no match is found and $m(S_i, S_j)$ is 0.

The matching scores m(Si, Sj) for individual line segments are summed to produce an overall matching score M using the equation below.

$$M = \frac{\sum_{(i,j) \in Matches} m(S_i, S_j)}{\min(\sum_{i \in Target} w(S_i), \sum_{j \in Test} w(S_j))} \quad \text{Equation 26}$$

Matches is the set of all line segments that matched with non 0 values, Test is the stored template that is used to test the new template Target to determine if the sclera images match. If the sum M exceeds a predetermined threshold, then the new image is considered to match the stored template, otherwise the two images are not considered matches. In an embodiment of a biometric identification system using the process of FIG. 2, a match occurs when a person with a registered sclera template is authenticated with the identification system using the process depicted in FIG. 2.

Figure 9:
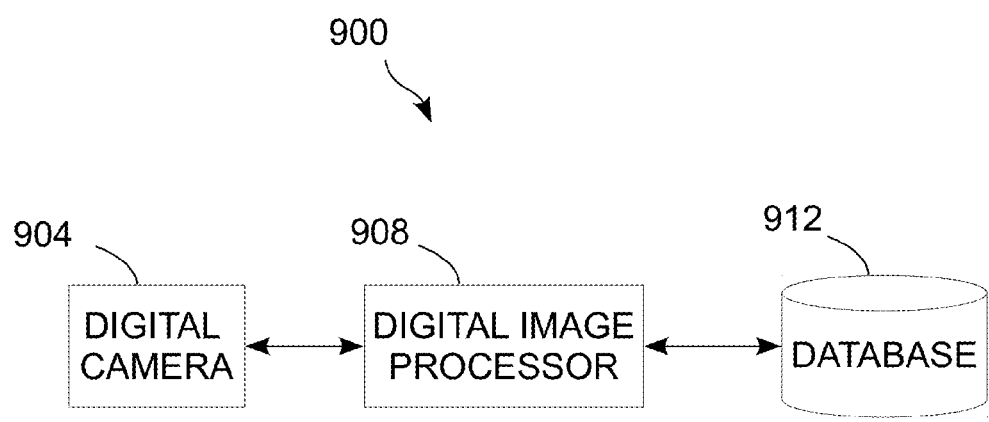
FIG. 9 is a block diagram of a system that may be used to implement the method of FIG. 2.

A system that may be used to implement the image processing method described above is shown in FIG. 9. The system 900 includes a digital camera 904, a digital image processor 908, and a database 912. The digital camera, which may generate color or grayscale images, is located at a position where a subject may be standing or seated. The camera need not be positioned where the subject is aware of the camera and, thus, cooperative for providing an image of the subject's eye. The camera may be, for example, a Sony DSLR-A100 camera, although any high resolution digital camera is appropriate. Other cameras that may be used include near infrared, infrared, visible, multispectral, and hyperspectral cameras. The digital image processor 908 may be a general purpose microprocessor or a special purpose digital signal processor (DSP). The processor is provided with appropriate interface circuitry for retrieving the image signal from the camera or a stored template from the database 912. Instructions to be executed by the processor 908 may be stored in an internal memory of the processor or in an external memory coupled to the processor in a known manner. Execution of the stored instructions by the processor 908 results in the system 900 performing an image processing method similar to the one described above with reference to FIG. 2. A template generated by the processor 908 may be stored in the database 912 for future comparisons or the generated template may be compared to a stored template to determine whether a subject being imaged corresponds to a subject having a template stored in the database 912. Database 912 may be any appropriate data management system and storage media, such as a database management system having a hard disk drive or other non-volatile memory. The templates stored in the database 912 may be indexed with reference to extrema points or types of fitted curves.

In another embodiment, a system and method may use structure within an iris as well as patterns within a sclera to improve recognition accuracy and increase the degree of the freedom in subject recognition. The use of iris and sclera features for subject identification is referred to herein as "iris and sclera multimodal recognition". A method for implementing iris and sclera multimodal recognition includes eye illumination, eye image acquisition (sclera, iris, and pupil), image segmentation, feature extraction, feature registration, and template generation. This method is similar to the one described above except the image segmentation retains the iris in the acquired image, the feature extraction includes structure within the iris, and the template generation identifies sclera patterns and iris structure. The feature extraction of iris could be wavelet based method, descriptor based method, and/or spatial-domain method. As described above, a stored template may be compare to a template obtained from another acquired eye image to identify the subject in the second image as corresponding to or not corresponding to the subject for the stored template.

The comparison of templates in the iris and sclera multimodal system may use feature level fusion, template level fusion, and/or score level fusion. For example, the sclera and iris regions may be processed separately and the templates generated for each separate region may then be stored for later comparison. Templates generated from a later acquired image for both the iris and sclera areas may be separately compared to one or more stored templates to generate a pair of matching scores. If both matching scores are higher than the matching thresholds, the subjects are deemed the same. If one of the scores does not meet or exceed the matching threshold, the context of the recognition scenario may be used to determine the criteria for a match. For example, in a highly secured situation, one low matching score may be sufficient to evaluate a subject as not corresponding to the subject for a stored template. In a less secured scenario, such as access to a home computer, one matching score exceeding one threshold by a predetermined percentage may be adequate to declare the subjects as corresponding to one another. In a similar manner, sclera recognition may be combined with face recognition, skin tissue recognition, or some other biometric characteristic recognition system to improve recognition accuracy for the system.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for obtaining an identification characteristic for a subject comprising:
  acquiring an image of an eye of a subject with a digital camera;
  segmenting the eye image into different regions with a digital image processor;
  extracting features in a sclera region segmented from the eye image with the digital image processor, the extraction comprising:
    generating with the digital image processor a linear representation of at least one vein in the sclera region segmented from the eye image, the linear representation including a plurality of line segments that correspond to the at least one vein;
  generating data identifying at least one feature extracted from the sclera region of the eye image with the digital image processor, the generation comprising:
    identifying with the digital image processor data corresponding to a center and angle of each line segment in the plurality of line segments with reference to a center of a pupil in the eye image; and
  storing the data identifying the at least one feature in a database with the digital image processor.

2. The method of claim 1, the eye image segmentation further comprising:
  segmenting the eye image into an iris region and sclera region with the digital image processor; and
  identifying a limbic boundary between the iris region and the sclera region with the digital image processor.

3. The method of claim 2 further comprising:
  identifying a medial point position and a lateral point position in the eye image with the digital image processor.

4. The method of claim 1 wherein the extracted feature is a blood vessel pattern in the sclera region.

5. The method of claim 1 further comprising:
  generating with the digital image processor a model of eyelids in the eye image with a two dimensional polynomial curve.

6. The method of claim 1, the data generation further comprising:
  identifying with the digital image processor locations for vein patterns, vein lines, and extrema points in the sclera region.

7. The method of claim 1, the data generation further comprising:

generating with the digital image processor model parameters from features via wavelet, curve fitting method, neural network, filtering method, and other pattern recognition methods.

8. The method of claim 1 further comprising:
comparing with the digital image processor identifying data generated from a first eye image to identifying data obtained from a second eye image to generate a comparison score; and
determining with the digital image processor that a subject from which the first eye image is obtained corresponds to the a subject from which the second eye image is obtained in response to the comparison score being equal to or greater than a matching threshold.

9. The method of claim 2 further comprising:
extracting features in the iris region with the digital image processor;
generating with the digital image processor data identifying at least one feature extracted from the iris region.

10. The method of claim 9 further comprising:
comparing identifying data generated for a feature extracted from the sclera region in a first eye image to identifying data generated for a feature extracted from the sclera region in a second eye image to generate a sclera comparison score with the digital image processor;
comparing identifying data generated for a feature extracted from the iris region in the first eye image to identifying data generated for a feature extracted from the iris region in the second eye image to generate an iris comparison score with the digital image processor; and
determining with the digital image processor that a subject from which the first eye image is obtained corresponds to a subject from which the second eye image is obtained in response to at least one of the sclera comparison score and the iris comparison score being equal to or greater than a matching threshold.

11. The method of claim 1, the eye image acquisition further comprising:
illuminating the eye with a light source configured to emit one of a near infrared, infrared, visible, multispectral, and a hyperspectral frequency light.

12. The method of claim 1, the eye image acquisition further comprising:
illuminating the eye with a light source configured to emit one of a polarized or non-polarized light.

13. The method of claim 1, the eye image acquisition further comprising:
illuminating the eye with a light source that is close to or remote from the eye.

14. The method of claim 1 wherein the feature extraction is preceded by a feature enhancement method including:
generating a plurality of filtered images from at least one of the segmented regions by applying a plurality of image filters with the digital image processor; and
combining the filtered images into a single enhanced image of the at least one of the segmented regions with the digital image processor.

15. The method of claim 1, the generation of identifying data further comprising:
generating with the digital image processor a bit map of the sclera region that identifies features.

16. The method of claim 1, the generation of identifying data further comprising:
generating with the digital image processor a list of features with positional information about each feature.

17. The method of claim 1, the generation of identifying data further comprising:
generating with the digital image processor a template for the extracted features.

18. The method of claim 1 wherein the digital image processor generates identifying data in one of a binary, integer, or floating number format.

19. The method of claim 10 wherein the subject determination includes iris and sclera feature fusion.

20. The method of claim 10 wherein the subject determination includes iris and sclera template fusion.

21. The method of claim 10 wherein the subject determination includes iris and sclera comparison score fusion.

22. A system for obtaining an identification characteristic for a subject comprising:
a digital camera configured to acquire an image of an eye of a subject;
a digital image processor configured to:
segment the eye image into different regions;
extract features in a sclera region segmented from the eye image the extraction comprising:
generation of a linear representation of at least one vein in the sclera region segmented from the eye image, the linear representation including a plurality of line segments that correspond to the at least one vein; and
generate data identifying at least one feature extracted from the sclera region of the eye image, the generation comprising:
identification of data corresponding to a center and angle of each line segment in the plurality of line segments with reference to a center of a pupil in the eye image; and
a database for storage of identifying data.

23. The system of claim 22, the digital image processor being further configured to compare identifying data stored in the database to identifying data obtained from a second eye image to generate a comparison score; and
determining a subject from which the stored identifying data is obtained corresponds to a subject from which the second eye image is obtained in response to the comparison score being equal to or greater than a matching threshold.

24. The system of claim 22 wherein the digital camera is one of a near infrared, infrared, visible, multispectral, and hyperspectral camera.

25. The system of claim 22 wherein the digital camera is one of a polarized and non-polarized camera.

26. The system of claim 22 wherein the digital camera is located closely or remotely from the eye being imaged.

* * * * *